US010276284B2

(12) United States Patent
Kehl et al.

(10) Patent No.: US 10,276,284 B2
(45) Date of Patent: *Apr. 30, 2019

(54) METHODS AND APPARATUS FOR PREPARING POWER TRANSMISSION CABLES

(71) Applicants: Tyco Electronics Raychem GmbH, Ottobrunn (DE); TE Connectivity Corporation, Berwyn, PA (US)

(72) Inventors: Ladislaus Kehl, Dorfen (DE); Terry Edward Frye, Cary, NC (US)

(73) Assignees: TYCO ELECTRONICS RAYCHEM GMBH, Ottobrunn (DE); TE CONNECTIVITY CORPORATION, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,415

(22) Filed: Feb. 20, 2018

(65) Prior Publication Data

US 2018/0174713 A1    Jun. 21, 2018

Related U.S. Application Data

(63) Continuation of application No. 14/622,216, filed on Feb. 13, 2015, now Pat. No. 9,934,889, which is a
(Continued)

(51) Int. Cl.
  *C09D 5/24*    (2006.01)
  *H01B 1/24*    (2006.01)
  (Continued)

(52) U.S. Cl.
  CPC .......... *H01B 13/016* (2013.01); *B24B 19/02* (2013.01); *B24B 23/08* (2013.01); *B24B 27/003* (2013.01);
  (Continued)

(58) Field of Classification Search
  CPC ....... B24B 19/02; B24B 23/08; B24B 27/003; B26D 3/06; H02G 1/1226; H02G 1/1236;
  (Continued)

(56) References Cited

U.S. PATENT DOCUMENTS 1,798,683 A    9/1929    Korab
2,989,806 A    6/1961    Davis
(Continued)

FOREIGN PATENT DOCUMENTS

GB    637521         5/1950
GB    637521 A   *   5/1950    ............. B23D 61/10

OTHER PUBLICATIONS

"Dremel 9936 Structured Tool Tungsten Carbide Cutter (Wheel) / Model 9936" Retrieved from http://www.dremel.com/en-us/Accessories/Pages/ProductDetail.aspx?pid=9936 (4 pages) (Aug. 29, 2011).
(Continued)

*Primary Examiner* — Tyrone V Hall, Jr.
(74) *Attorney, Agent, or Firm* — Myers Bigel, P.A.

(57) ABSTRACT

A method for preparing a polymer insulated cable including a semiconductive layer surrounding a polymeric insulation layer includes: cutting the semiconductive layer by grinding a circumferential dividing groove in the semiconductive layer using a rotating grinding surface, wherein the dividing groove defines first and second semiconductive sections of the semiconductive layer on opposed sides of the dividing groove; and thereafter removing the second semiconductive section from the polymeric insulation layer while retaining the first semiconductive section on the polymeric insulation layer.

10 Claims, 11 Drawing Sheets

Related U.S. Application Data continuation of application No. 13/298,915, filed on Nov. 17, 2011, now Pat. No. 8,986,073.

(60) Provisional application No. 61/529,065, filed on Aug. 30, 2011.

(51) Int. Cl.

| | |
|---|---|
| *H01B 3/30* | (2006.01) |
| *H02G 1/12* | (2006.01) |
| *H02G 1/14* | (2006.01) |
| *B24B 19/06* | (2006.01) |
| *B24B 23/08* | (2006.01) |
| *B24B 27/00* | (2006.01) |
| *H01B 13/016* | (2006.01) |
| *B24B 19/02* | (2006.01) |

(52) U.S. Cl.
CPC ............... *C09D 5/24* (2013.01); *H01B 1/24* (2013.01); *H01B 3/30* (2013.01); *H02G 1/1239* (2013.01); *H02G 1/1285* (2013.01); *H02G 1/14* (2013.01); *Y10T 29/49117* (2015.01); *Y10T 83/0304* (2015.04); *Y10T 83/0385* (2015.04)

(58) Field of Classification Search
CPC .. H02G 1/1239; H02G 1/1246; H02G 1/1265; H02G 1/127; H02G 1/1285
See application file for complete search history.

(56) References Cited

U.S. PATENT DOCUMENTS

| | | |
|---|---|---|
| 4,127,937 A | 12/1978 | Harless et al. |
| 4,469,539 A | 9/1984 | Wade et al. |
| 4,876,792 A | 10/1989 | Black |
| 4,945,636 A | 8/1990 | Takizawa |
| 4,958,433 A | 9/1990 | Persson |
| 4,972,583 A | 11/1990 | Pinchon |
| 5,070,615 A | 12/1991 | Michael, III |
| 5,107,735 A | 4/1992 | Ramun et al. |
| 5,109,590 A | 5/1992 | Endres |
| 5,127,153 A | 7/1992 | Mitra |
| 5,165,206 A | 11/1992 | Sword et al. |
| 5,189,786 A | 3/1993 | Ishikawa et al. |
| 5,412,864 A | 5/1995 | Pack et al. |
| 5,457,877 A * | 10/1995 | McDermott ......... H02G 1/1239 29/426.4 |
| 5,487,220 A | 1/1996 | Saitou |
| 5,611,146 A | 3/1997 | Ducret |
| 6,044,744 A | 4/2000 | Eslambolchi et al. |
| 6,196,087 B1 | 3/2001 | Furuya |
| 6,662,450 B1 | 12/2003 | Ducret |
| 6,779,273 B1 | 8/2004 | Clifton et al. |
| 8,067,694 B2 | 11/2011 | Patel et al. |
| 9,934,889 B2 * | 4/2018 | Kehl .................. H01B 13/016 |
| 2005/0066528 A1 | 3/2005 | Ducret |
| 2007/0144011 A1 | 6/2007 | Ducret |
| 2008/0302556 A1 | 12/2008 | Varkey et al. |
| 2009/0200059 A1* | 8/2009 | Cinquemani ......... H01B 7/189 174/113 R |
| 2010/0132973 A1 | 6/2010 | Fitz et al. |
| 2012/0060379 A1 | 3/2012 | Culf |
| 2013/0000128 A1 | 1/2013 | Johnston |
| 2013/0047814 A1 | 2/2013 | Kehl et al. |
| 2013/0053497 A1 | 2/2013 | Tully et al. |

OTHER PUBLICATIONS

"Tricks of the Trade" Tyco Electronics Raychem GmbH, Energy Division, Retrieved from http://energy.tycoelectronics.com (30 pages).

* cited by examiner

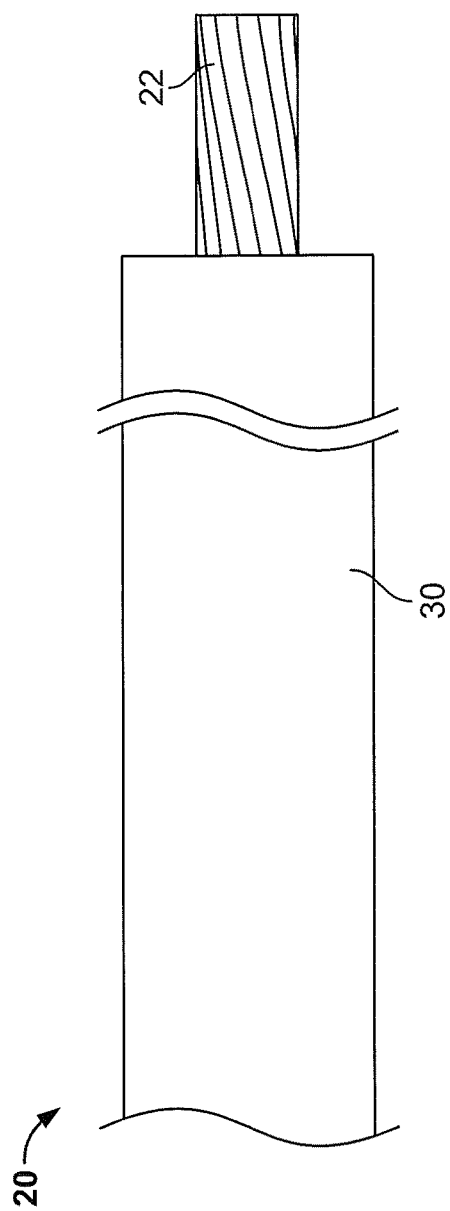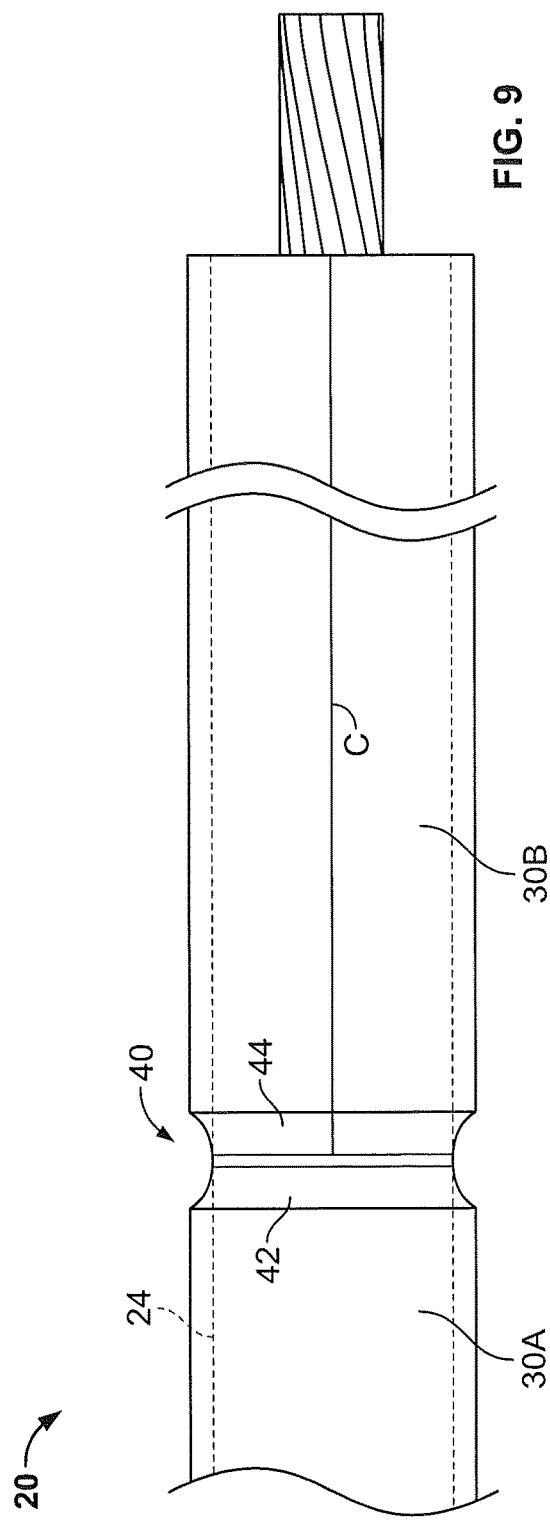

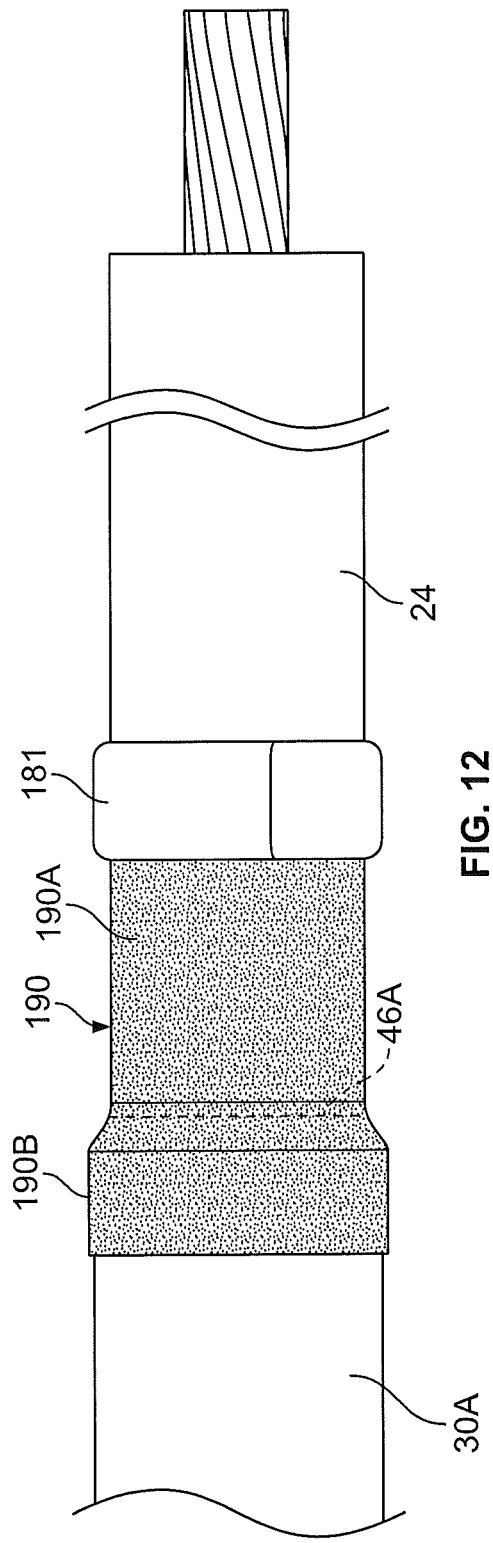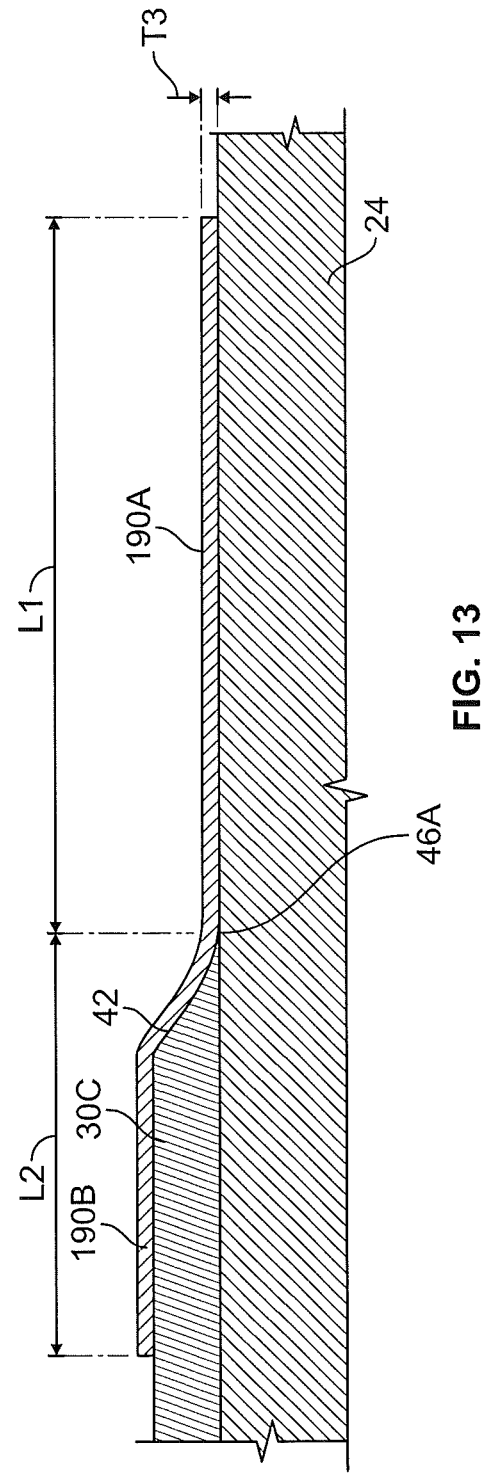

METHODS AND APPARATUS FOR PREPARING POWER TRANSMISSION CABLES

RELATED APPLICATION(S)

The present application is a continuation of and claims priority from U.S. patent application Ser. No. 14/622,216, filed Feb. 13, 2015, which is a continuation of and claims priority from U.S. patent application Ser. No. 13/298,915, filed Nov. 17, 2011, now U.S. Pat. No. 8,986,073, which claims the benefit of and priority from U.S. Provisional Patent Application No. 61/529,065, filed Aug. 30, 2011, the disclosures of which are incorporated herein by reference by their entireties.

FIELD OF THE INVENTION

The present invention relates to electrical cables and, more particularly, to the preparation of electrical power transmission cables for termination.

BACKGROUND OF THE INVENTION

Terminations for high voltage (i.e., greater than about 1 kV) polymeric insulated electrical transmission cables are typically accomplished by cutting back an outer polymeric jacket, neutral conductors, a semiconductive layer, and a primary polymeric insulation layer to expose a primary conductor, on which an electrical connector is installed. The exposed components of the cable must be protected. For high voltage cables, such protection typically requires electrical stress control at the termination and various stress control elements have been provided for this purpose.

Two types of polymer insulated transmission cable in wide use are ethylene propylene rubber (EPR) insulated cables and cross-linked polyethylene (XLPE) insulated cables. In each type of cable, a primary conductor is surrounded by a layer of the insulation (EPR or XLPE), which is in turn surrounded by a semiconductive layer. The semiconductive layer is a layer of a polymer composite including an electrically conductive material (e.g., polyethylene (PE) containing carbon black).

The end of the cable's semiconductive layer is the electrically most stressed location within a cable accessory. Components provided by accessory manufacturers are designed to reduce this stress to a tolerable level. However, in order to achieve this, certain requirements apply, which are difficult to meet with typically used cable preparation tools on EPR cables and their semiconductive layers. Namely, the region of the transition should be void free (no air pockets) and smooth to allow the stress grading components to follow the cable surface closely and provide sufficient interface pressure.

EPR cables usually have semiconductive layers that cannot be taken off using cutting type cable strippers designed for bonded semiconductive layers on XLPE cables. The semiconductive layers on EPR cables are typically strippable after applying moderate heat to the semiconductive layer (i.e., with a torch). Typical tools to define the end of the semiconductive layer to be stripped are cutting blades and round files. Blades may cut too deeply or not deeply enough considering the typical manufacturing tolerances of semiconductive layers. Cutting too deep may introduce immediate air pockets within the cut. Not cutting deep enough may cause air pockets by lifting up the end of the semiconductive layer when stripping the other end. Round files offer the advantage of providing a kind of chamfer at the cut back and a visual indication when the right depth has been reached. However, due to the tangential movement of the file, the risk of lifting up the remaining thin end of the semiconductive layer remains.

To provide a smooth transition from the cable's semiconductive layer to its insulation, conductive paints are sometimes used. However, many such paints do not stick very well to EPR even though they stick quite well to XLPE.

SUMMARY OF THE INVENTION

According to embodiments of the present invention, a method for preparing a polymer insulated cable including a semiconductive layer surrounding a polymeric insulation layer includes: cutting the semiconductive layer by grinding a circumferential dividing groove in the semiconductive layer using a rotating grinding surface, wherein the dividing groove defines first and second semiconductive sections of the semiconductive layer on opposed sides of the dividing groove; and thereafter removing the second semiconductive section from the polymeric insulation layer while retaining the first semiconductive section on the polymeric insulation layer.

According to method embodiments of the present invention, a method for preparing a polymer insulated cable including a semiconductive layer surrounding a polymeric insulation layer includes: providing a cutting tool including a driver and a grinding surface; releasably coupling the driver and the grinding surface to the cable using a mounting tool; thereafter cutting the semiconductive layer by grinding a circumferential dividing groove in the semiconductive layer using the grinding surface, wherein the dividing groove defines first and second semiconductive sections of the semiconductive layer on opposed sides of the dividing groove; and thereafter removing the second semiconductive section from the polymeric insulation layer while retaining the first semiconductive section on the polymeric insulation layer.

According to embodiments of the present invention, an apparatus for preparing a polymer insulated cable including a semiconductive layer surrounding a polymeric insulation layer includes a cutting tool and a mounting tool. The cutting tool includes a driver and a grinding surface. The mounting tool is configured to releasably couple the cutting tool to the cable such that the grinding surface engages the semiconductive layer and can be used to grind a circumferential dividing groove in the semiconductive layer. The dividing groove defines first and second semiconductive sections of the semiconductive layer on opposed sides of the dividing groove.

According to embodiments of the present invention, a method for preparing a polymer insulated cable includes: applying an electrically conductive paint composition to the polymer insulated cable. The electrically conductive paint composition includes an electrically conductive material mixed with a cyanoacrylate.

According to method embodiments of the present invention, a method for preparing a polymer insulated cable includes applying an electrically conductive paint composition to the polymer insulated cable. The electrically conductive paint composition includes an electrically conductive paint mixed with a glue. The electrically conductive paint includes a carrier and an electrically conductive material.

According to further embodiments of the present invention, an electrically conductive paint composition includes an electrically conductive material mixed with a cyanoacrylate.

According to embodiments of the present invention, an electrically conductive paint composition includes an electrically conductive paint mixed with a glue. The electrically conductive paint includes a carrier and an electrically conductive material.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 8-14 illustrate methods for preparing the cable according to embodiments of the present invention.

DETAILED DESCRIPTION OF EMBODIMENTS OF THE INVENTION

Figure 1:
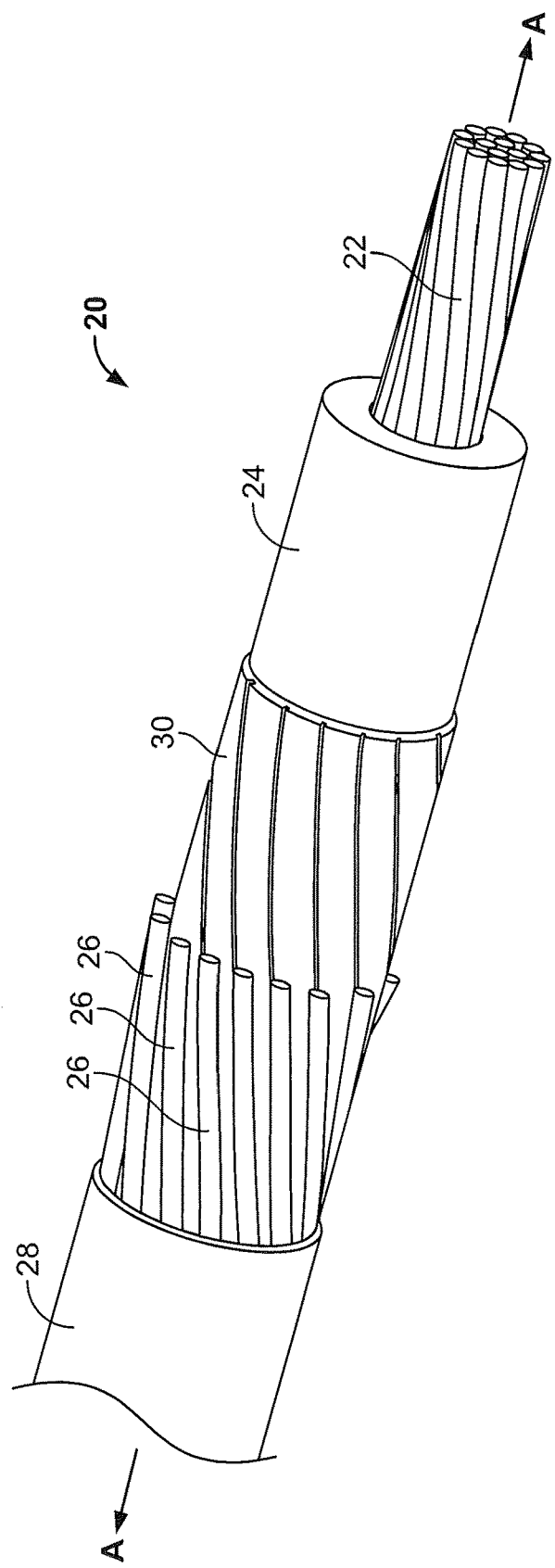
FIG. 1 is perspective view of a polymer insulated cable for use with methods and apparatus according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Systems, methods and apparatus according to embodiments of the present invention can be used to prepare a polymer insulated cable for proper installation of a cable accessory or accessories, such as an electrical stress control element. According to some embodiments, the inventive systems, methods and apparatus are used to prepare an EPR insulated cable, and aspects of the methods and apparatus may be particularly beneficial when used with EPR cables. However, it will be appreciated that some embodiments and aspects of the invention may be employed to prepare other types of polymer insulated cables such as XLPE insulated cables.

An exemplary polymer insulated electrical power transmission cable 20 for use with the systems, methods and apparatus of the present invention is shown in FIG. 1. The polymeric cable 20 includes a primary electrical conductor 22, a primary polymeric conductor insulation layer 24, a semiconductive layer 30, one or more neutral conductors 26, and a jacket 28, with each component being concentrically surrounded by the next. According to some embodiments and as shown, the neutral conductors 26 are individual wires, which may be helically wound about the semiconductive layer 30. The cable 20 has a lengthwise axis A-A. The primary conductor 22 may be formed of any suitable electrically conductive materials such as copper (solid or stranded). The polymeric insulation layer 24 may be formed of any suitable electrically insulative material such as cross-linked polyethylene (XLPE) or ethylene propylene rubber EPR. The semiconductive layer 30 may be formed of any suitable semiconductor material such as carbon black with PE. The neutral conductors 26 may be formed of any suitable material such as copper. The jacket 28 may be formed of any suitable material such as PVC or PE. However, it will be appreciated that polymeric cables of other types and configurations may be used.

According to some embodiments, the semiconductive layer 30 has a thickness T1 (FIG. 7) in the range of from about 0.8 mm to 1.5 mm and, according to some embodiments, in the range of from about 0.5 mm to 2.5 mm.

Figure 14:
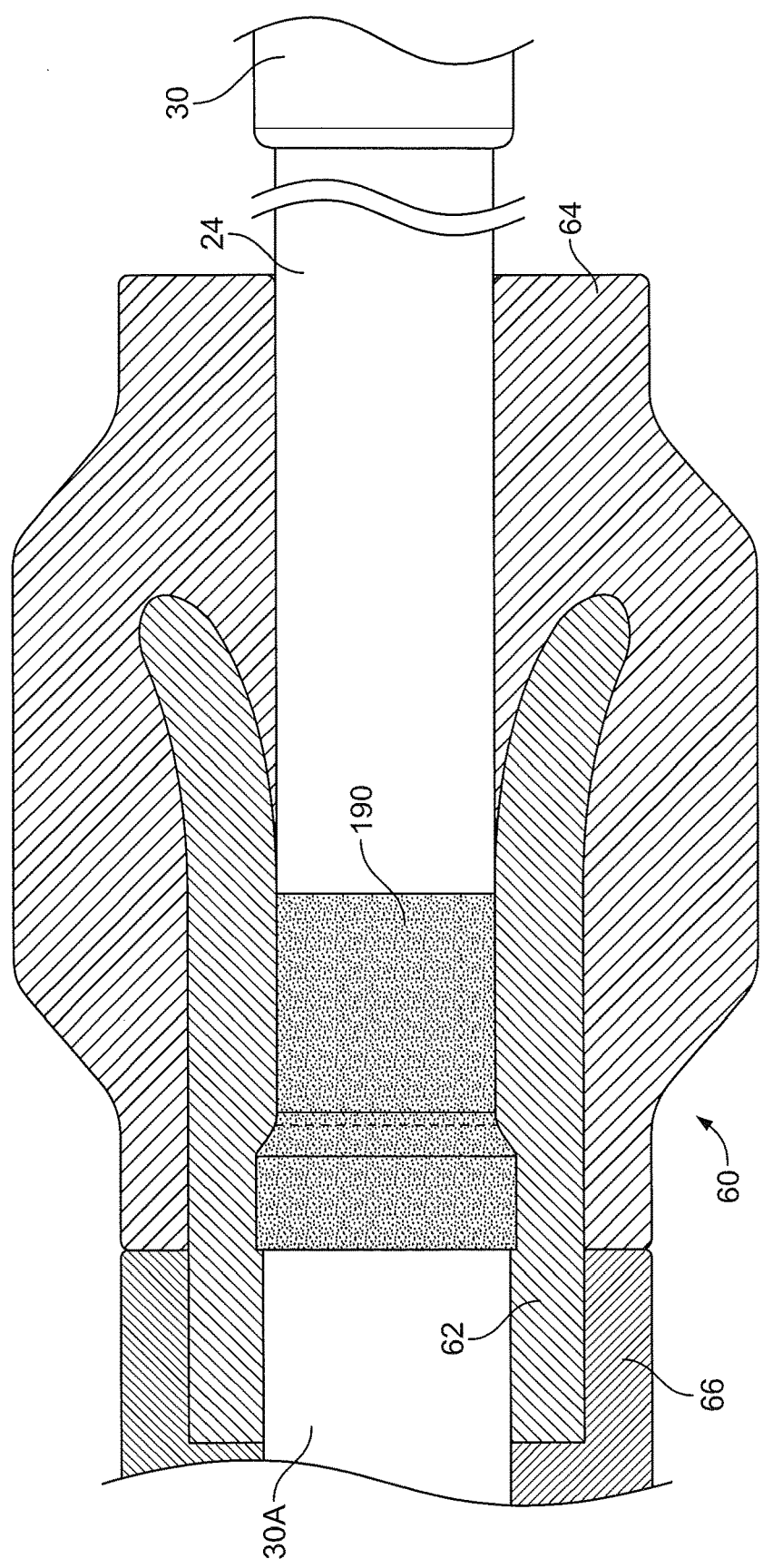

The cable 20, once prepared, may be terminated (e.g., terminated or spliced to another cable) and covered in any desired manner and suitable methods and cable accessories are known to those of skill in the art. A connector 30 (FIG. 14), for example, may be mounted on the conductor 22 and a stress relief cone 60, for example, may be installed about cable.

The connector 30 is electrically conductive and may include a crimp-type or bolt-type connector, for example. The connector 30 may be formed of copper or aluminum, for example.

The illustrated stress relief cone 60 (FIG. 14) includes a tubular, electrically conductive deflector 62, surrounded by a tubular electrically insulating body 64 and an electrically insulating cover 66. The deflector 62 may be formed of conductive silicone rubber, for example. The insulating body 64 may be formed of an elastomer such as silicone rubber or EPDM, for example. The cover 66 may be formed of an elastomer such as silicone rubber, for example. Other types and configurations of stress relief tubes and other cable accessories may be used.

Figure 15:
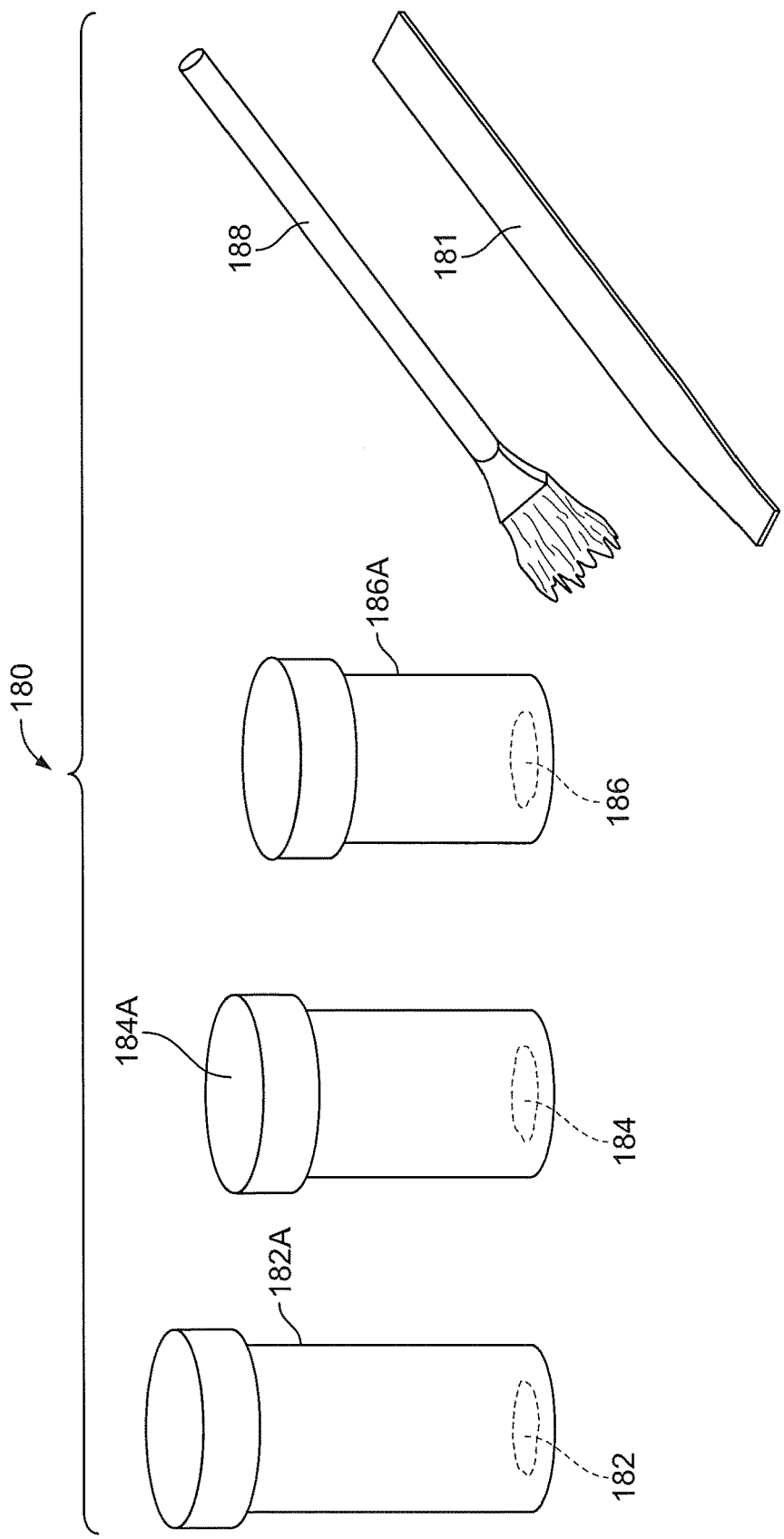
FIG. 15 is a perspective view of a conductive paint system according to embodiments of the present invention.

The illustrative cable preparation system includes a cutting apparatus 100 (FIGS. 2-7) and a conductive paint system 180 (FIG. 15). The cutting apparatus 100 is used to assist in removing a section of the semiconductive layer 30 and the paint system 180 is used to extend the effective semiconductor layer on the prepared cable. While the cutting apparatus 100 and the paint system 180 are described hereinbelow as being used together, according to other embodiments, the cutting apparatus 100 and the paint system 180 may be used independently of one another. For example, the semiconductive layer 30 may be severed using a different technique or apparatus, or the semiconductive layer 30 may be cut using the apparatus 100 but left either unpainted or painted using a different paint or paint system than described herein.

With reference to FIGS. 2-7, the cutting apparatus 100 includes a cutting tool 111 and a positioning or mounting tool 120. The cutting tool 111 includes a power driver 110 and a cutting bit 116.

Figure 3:
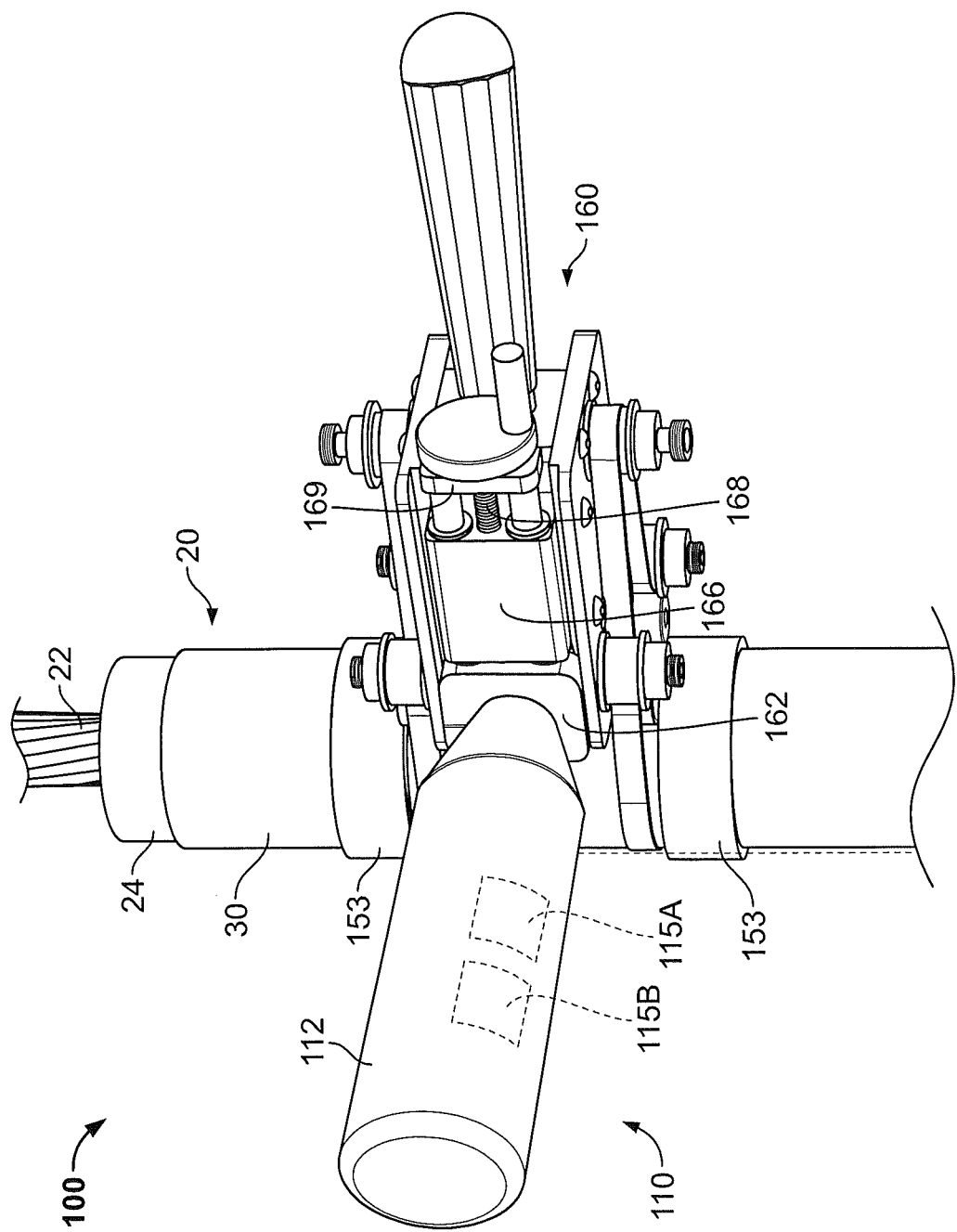
FIG. 3 is a rear, bottom perspective view of the cutting apparatus of FIG. 2 mounted on the cable.
Figure 4:
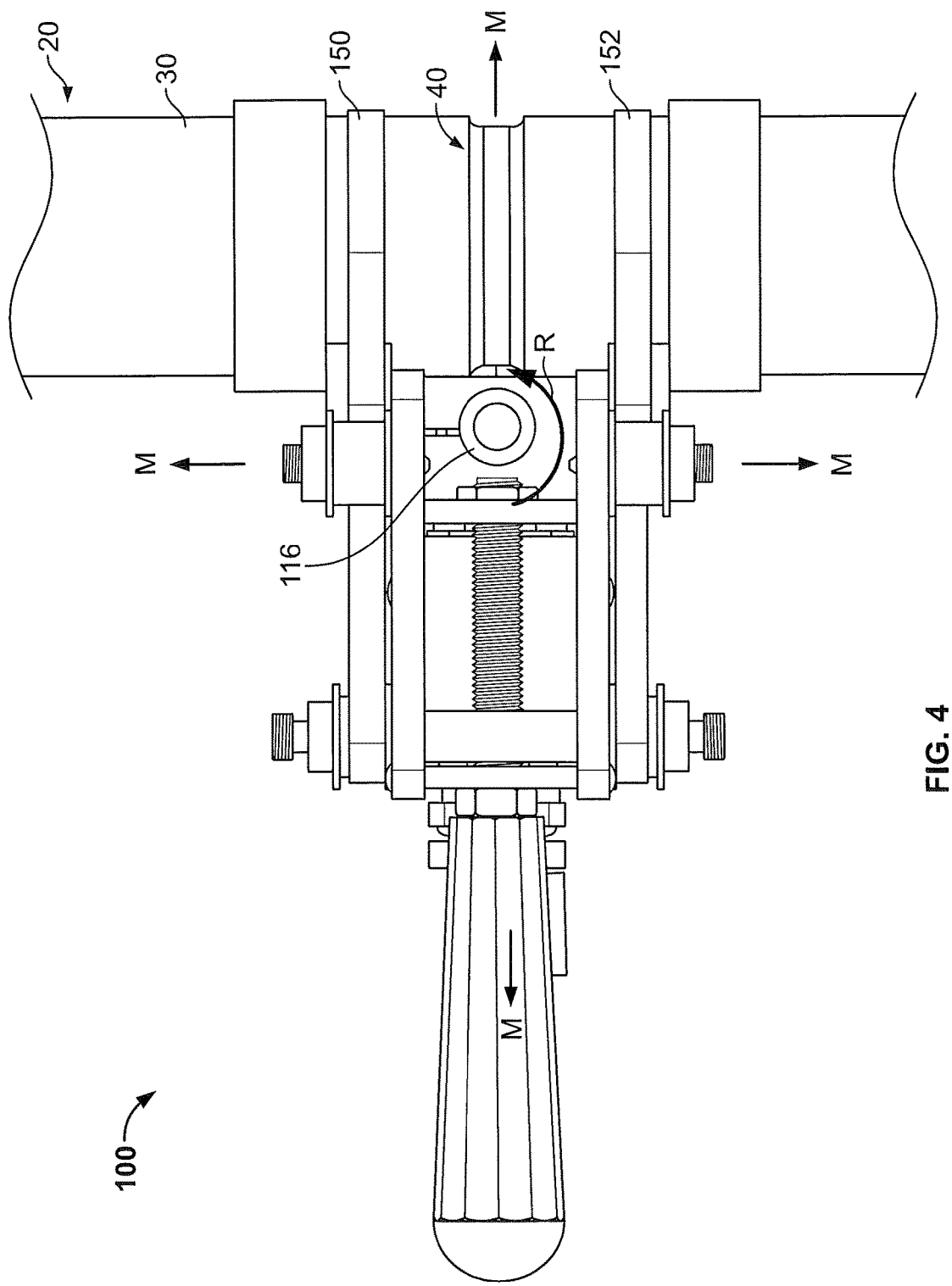
FIG. 4 is a side view of the cutting apparatus of FIG. 2 mounted on the cable.
Figure 5:
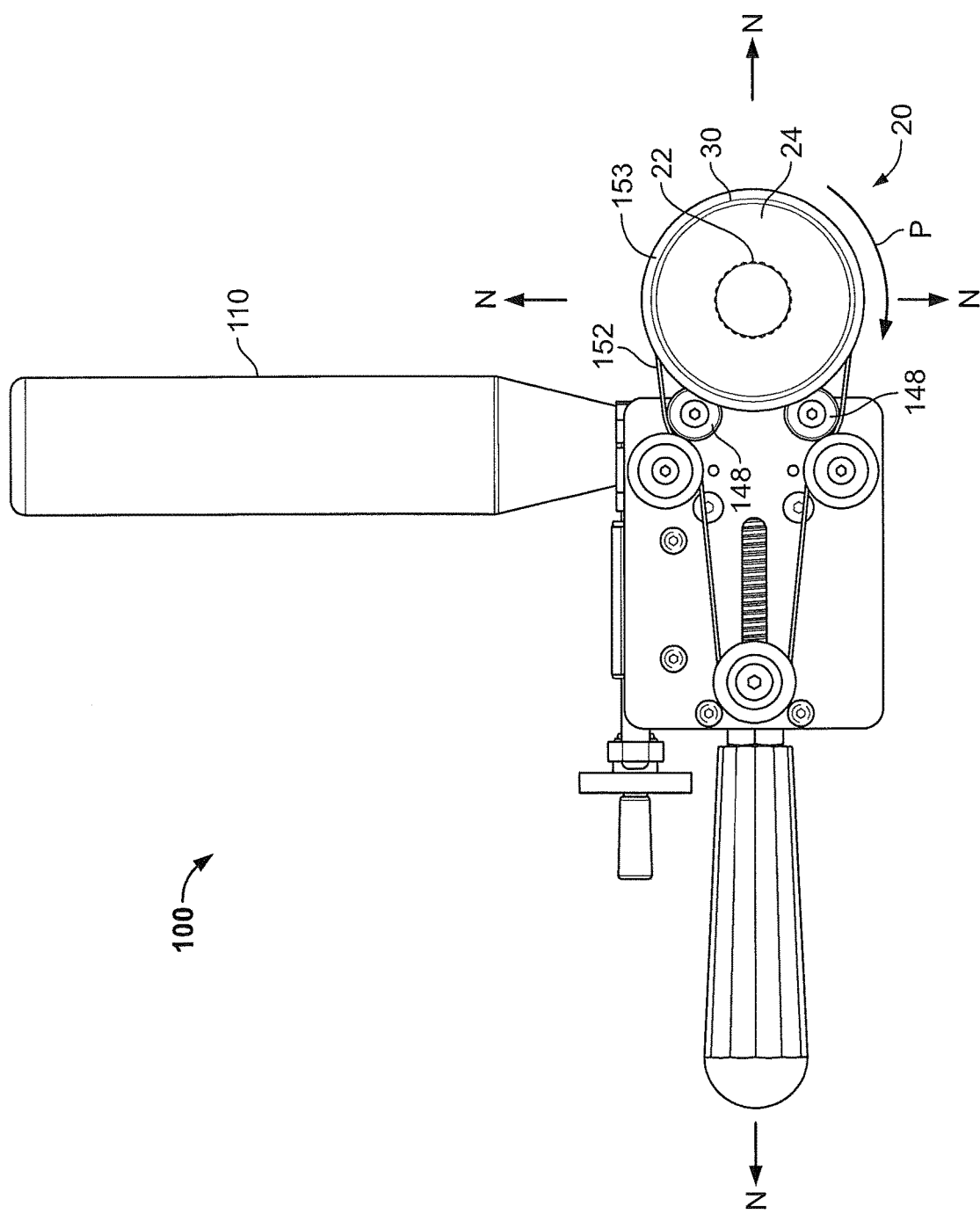
FIG. 5 is a top view of the cutting apparatus of FIG. 2 mounted on the cable.

The power driver 110 includes a housing 112 containing a driver motor 115A, and a power supply 115B (schematically illustrated in FIG. 3). The drive motor 115A may be an electric, hydraulic, or pneumatic motor, for example. The power supply 115B may be a battery or a cord or hose connection to an electric power source or a pressurized fluid (i.e., pneumatic or hydraulic). An output shaft 114 (FIG. 7) extends from the housing 112 and is operably connected to the motor 115A (e.g., via transmission gearing or directly) to rotatively drive the shaft 114 in a rotational direction R (FIG. 4). A chuck 114A is provided on the end of the shaft 114.

Figure 6:
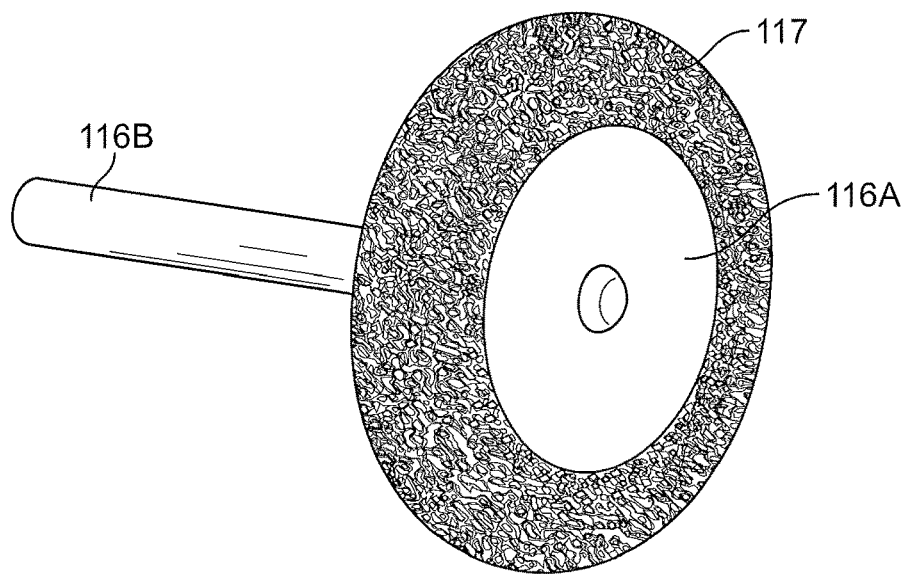
FIG. 6 is an enlarged perspective view of a grinding bit forming a part of the cutting apparatus of FIG. 2.

The cutting bit 116 (FIGS. 6 and 7) is coupled to the shaft 114 by a shaft 116B releasably captured by the chuck 114A. With reference to FIG. 6, the cutting bit 116 has a disc-shaped body 116A surrounded by an integral, annular grinding surface 117. The grinding surface 117 includes an annular peripheral section 117A and opposed annular side sections 117B (FIG. 7).

The cutting bit 116 may be of any suitable construction. According to some embodiments, the cutting bit is a structured tooth cutter wheel. According to some embodiments, the cutting bit is formed of tungsten carbide and, in some embodiments, is a tungsten carbide structured tooth cutting wheel. Suitable cutting bits may include the 9936 Structured Tooth Tungsten Carbide Cutter (Wheel) available from Dremel, a division of Robert Bosch Tool Corporation.

Figure 7:
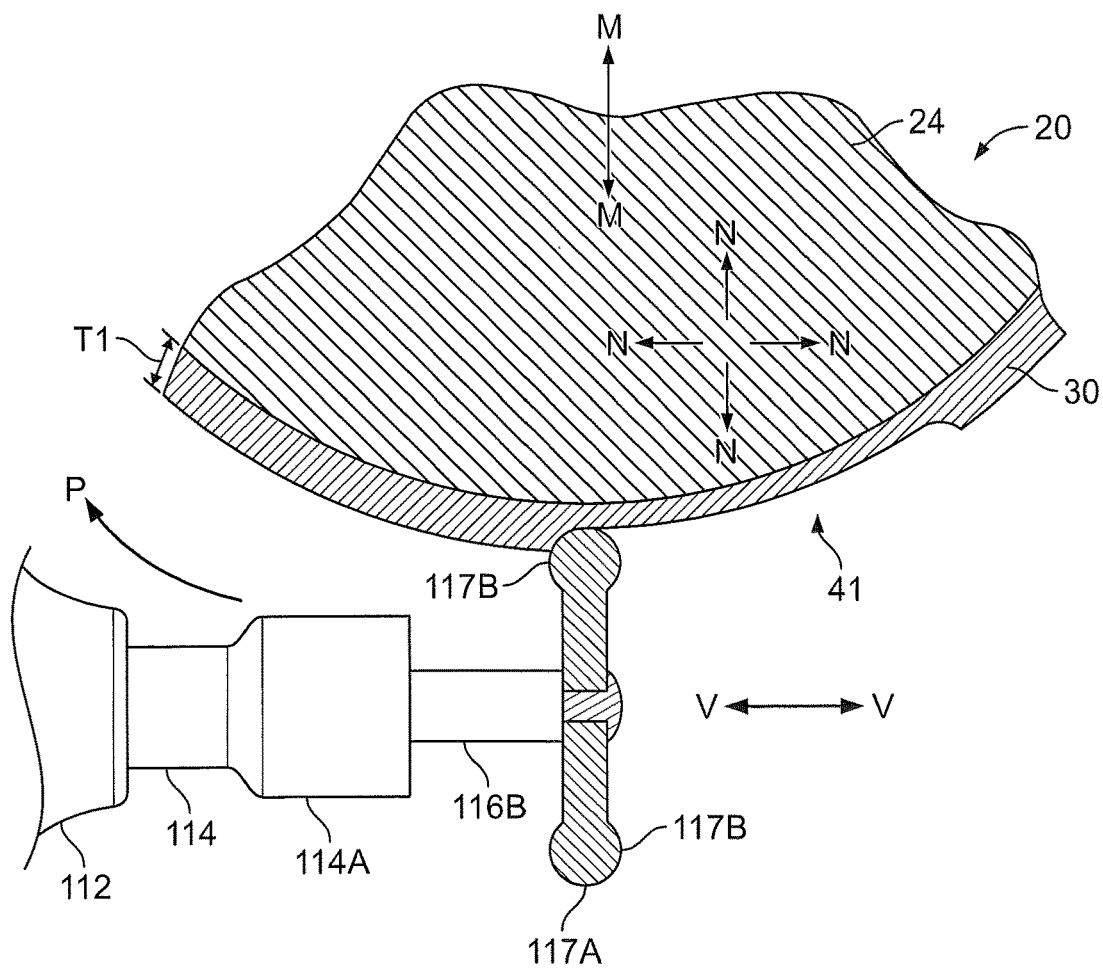
FIG. 7 is an enlarged, fragmentary, cross-sectional view of the cable and the grinding apparatus of FIG. 2 wherein the grinding bit has formed a partial groove in a semiconductive layer of the cable.

The grinding surface 117 has a rounded or arcuate cross-sectional profile, as best seen in FIG. 7. In some embodiments, the cross-sectional profile of the grinding surface 117 is truncated circular.

Figure 2:
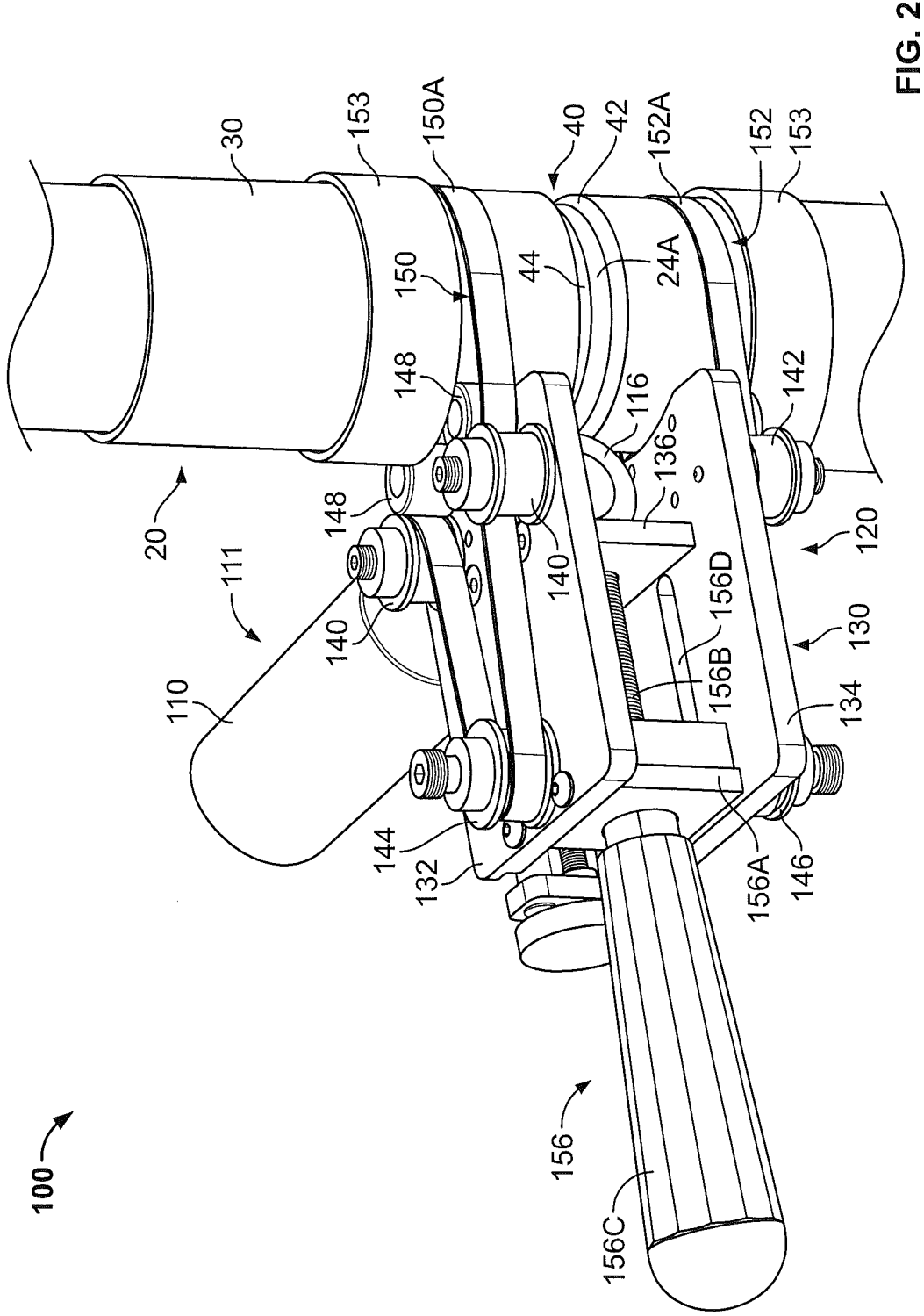
FIG. 2 is a rear, top perspective view of a cutting apparatus according to embodiments of the present invention on the cable of FIG. 1.

With reference to FIG. 2, the mounting tool 120 includes a frame 130. The frame 130 includes a top frame plate 132 and a bottom frame plate 134 fixedly joined by a connector plate 136. Upper front tracking rollers 148 are rotatably mounted on the top frame plate 132 and extended forwardly beyond the front edge of the plate 132. Upper front guide rollers 140 and lower front guide rollers 142 are rotatably mounted on the upper plate 132 and the lower plate 134, respectively. An upper rear guide roller 144 and a lower rear guide roller 146 are rotatably mounted in slots 156D in the plates 132, 134. Each of the rollers 140, 142, 144, 146, 148 rotates about an axis that is substantially parallel to the axis A-A of the cable 20 when the tool 120 is mounted on the cable 20 as described herein.

An upper coupling member in the form of a flexible belt or strap 150 extends around and between the rollers 148, 140 and 144 and includes a section 150A extending forwardly from the plate 132 to surroundingly engage the cable 20. Similarly, a lower coupling member in the form of a belt or strap 152 extends around the rollers 142 and 146 and includes a section 152A extending forwardly of the plate 134 to surroundingly engage the cable 20. According to some embodiments, the straps 150, 152 are formed of fiberglass reinforced neoprene.

A strap adjustment mechanism 156 is provided to selectively adjust the lengths of the strap sections 150A, 152A to cinch or tighten the straps 150, 152 about the cable 20 and thereby pull the tracking rollers 148 against the cable 20 outer diameter. The adjustment mechanism 156 includes a follower 156A mounted on a screw shaft 156B, which is rotatable using a handle 156C. The rollers 144, 146 are coupled to the follower 156A for movement therewith along the slots 156D. By rotating the handle 156C clockwise or counterclockwise, an operator can drive the rollers 144, 146 forward or backward and thereby adjust the lengths of the strap sections 150A, 152A.

The mounting tool 120 also includes a cutting bit depth adjustment mechanism 160. As best seen in FIG. 3, the housing 112 of the power driver 110 is securely and rigidly mounted in a yoke 162. The yoke 162 is in turn affixed to a follower 166. The follower 166 is mounted on a screw shaft 168 that is journaled in a fixed wall 164. By rotating a knob 169 clockwise or counterclockwise, the operator can drive the yoke 162, (and, thereby, the power driver 110 and the cutting bit 116) forward and backward to thereby adjust the position of the cutting bit relative to the tracking rollers 148 and the front edge of the frame 130.

The paint system 180 (FIG. 15) can be used to supply and apply an electrically conductive coating or paint composition with good adhesive properties with respect to the insulation 24. In particular, the conductive paint composition can adhere well to EPR insulation 24. According to some embodiments, the paint system includes a vessel 182A containing a supply of an electrically conductive paint 182, a vessel 184A containing a supply of a glue 184, an application brush 188, and a roll or strip of masking tape 181. In some embodiments, the paint system 180 also includes a vessel 186A containing a supply of a solvent 186.

According to some embodiments of the present invention, one or more surfaces of the cable 20 can be contacted with an electrically conductive paint composition. As discussed herein, in some embodiments, the cable 20 is an EPR insulated cable. The term "contacted" and grammatical variations thereof as used herein in reference to an electrically conductive paint composition are intended to include painting, applying, immersing, coating, spraying, rolling, dipping, and/or any variation and/or combination thereof. The electrically conductive paint composition can provide a smooth transition on the one or more surfaces to which it is applied. In certain embodiments, an electrically conductive paint composition is applied to an EPR insulated cable and provides a smooth transition from the EPR insulated cable's semiconductive layer 30 to the EPR insulated cable's insulation layer 24.

The electrically conductive paint composition can have desirable adhesive properties to the one or more surfaces to which it is applied. In particular embodiments of the present invention, the electrically conductive paint composition adheres strongly to the one or more surfaces to which it is applied.

In particular embodiments of the present invention, the electrically conductive paint composition comprises, consists essentially of, or consists of quantities of the electrically conductive paint 182, the glue 184, and, optionally, the solvent 186.

"Electrically conductive paint" as used herein, refers to a paint and/or coating that comprises, consists essentially of, or consists of an electrically conductive material and a carrier. The term "electrically conductive paint" includes a commercially available paint or coating, such as those commercially available from Henkel Acheson™ of Madison Heights, Mich. under the trademark DAG®. A suitable commercially available electrically conductive paint includes, but is not limited to, DAG®-T-502 from Henkel Acheson™ of Madison Heights, Mich.

"Electrically conductive material" as used herein, includes any material able to conduct electricity. Exemplary electrically conductive materials include, but are not limited to semimetals such as graphite, carbon, arsenic, antimony, bismuth, and tin; metals such as silver, gold, platinum, copper, cobalt, iron, aluminum, molybdenum, and nickel; metal alloys; and the like.

The electrically conductive paint 182 can comprise one or more electrically conductive materials, which may be the same or different. In certain embodiments of the present invention, the electrically conductive paint 182 comprises 1, 2, 3, 4, or more electrically conductive material(s). The electrically conductive material can be provided in a solid, powder, gel, and/or liquid form. The electrically conductive material can comprise fibers, flakes, particles including particles that have been coated with an electrically conductive material, nano-particles, beads, and/or any combination thereof. In certain embodiments of the present invention, the electrically conductive material can be present in the electrically conductive paint 182 as a dispersion of particles, such as a dispersion of colloidal and/or semi-colloidal particles.

The electrically conductive paint 182 can comprise a carrier, such as, but not limited to, an organic solvent. The electrically conductive paint 182 can comprise one or more solvents. Exemplary solvents include, but are not limited to, water; alcohols such as methanol, ethanol, isopropanol, and butanol; ketones such as methyl ethyl ketone, methyl isobutyl ketone, and N-methyl-2-pyrrolidone; esters, such as, butyl acetate; ethers such as alkyl ethers, dialkyl ethers, glycol ethers; and the like. Further exemplary solvents include those described in U.S. Pat. No. 7,001,947, which is incorporated herein by reference. In particular embodiments of the present invention, the solvent is a ketone such as methyl ethyl ketone.

According to some embodiments, the electrically conductive paint 182 has an electrical conductivity of at least about 30 ohms/sq @ 1 mil. Thereby, the electrically conductive paint 182 can provide the electrically conductive paint composition with an electrical conductivity of at least about 15 ohms/sq @ 1 mil.

The glue 184 in the electrically conductive paint composition can be any glue or adhesive known to those of skill in the art. In particular embodiments of the present invention, the glue 184 is a cyanoacrylate. "Cyanoacrylate" as used herein, refers generally to a chemical compound comprising an acrylate moiety substituted with a cyano group and, optionally, one or more additional functional groups. The electrically conductive paint composition can comprise one or more cyanoacrylates, which may be the same or different. In certain embodiments of the present invention, the electrically conductive paint composition comprises 1, 2, 3, 4, or more cyanoacrylate(s). Further, the term "cyanoacrylate" as used herein, includes a commercially available cyanoacrylate, such as, but not limited to, a cyanoacrylate sold under the trademark SICOMET® or Loctite®, both commercially available from Henkel Acheson™ of Madison Heights, Mich. Suitable commercial cyanoacrylates include, but are not limited to, SICOMET® 5023 and Loctite® 406 from Henkel Acheson™ of Madison Heights, Mich.

"Moiety" and "group" are used interchangeably herein to refer to a portion of a molecule, typically having a particular functional or structural feature, e.g., a linking group (a portion of a molecule connecting two other portions of the molecule).

"Substituted" as used herein to describe chemical structures, groups, or moieties, refers to the structure, group, or moiety comprising one or more substituents. As used herein, in cases in which a first group is "substituted with" a second group, the second group is attached to the first group whereby a moiety of the first group (typically a hydrogen) is replaced by the second group. The substituted group may contain one or more substituents that may be the same or different.

"Substituent" as used herein references a group that replaces another group in a chemical structure. Typical substituents include nonhydrogen atoms (e.g., halogens), functional groups (such as, but not limited to amino, sulfhydryl, carbonyl, hydroxyl, alkoxy, carboxyl, silyl, silyloxy, phosphate and the like), hydrocarbyl groups, and hydrocarbyl groups substituted with one or more heteroatoms. Exemplary substituents include, but are not limited to, alkyl, lower alkyl, halo, haloalkyl, alkenyl, alkynyl, cycloalkyl, cycloalkylalkyl, heterocyclo, heterocycloalkyl, aryl, arylalkyl, lower alkoxy, thioalkyl, hydroxyl, thio, mercapto, amino, imino, halo, cyano, nitro, nitroso, azido, carboxy, sulfide, sulfone, sulfoxy, phosphoryl, silyl, silylalkyl, silyloxy, boronyl, and modified lower alkyl.

In particular, an "acrylate moiety" as used herein, refers to a compound represented by the following structural formula:

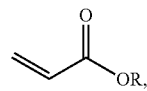

where R is selected from $C_{1-18}$ alkyl, alkoxy, alkoxyalkyl, aryloxy, cycloalkyl, alkenyl, cycloalkenyl, aryl, arylalkyl, arylalkenyl, alkynyl, arylalkynyl, allyl, heterocyclic, silyl, alkylsilyl, alkylsilylalkyl, and haloalkyl groups, each of which may be substituted with one or more substituents.

"Cyano" as used herein, refers to a —CN group.

In certain embodiments of the present invention, the term "cyanoacrylate" refers to an alpha cyanoacrylate represented by the following structure:

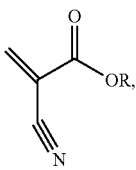

where R is selected from $C_{1-18}$ alkyl, alkoxy, alkoxyalkyl, aryloxy, cycloalkyl, alkenyl, cycloalkenyl, aryl, arylalkyl, arylalkenyl, alkynyl, arylalkynyl, allyl, heterocyclic, silyl, alkylsilyl, alkylsilylalkyl, and haloalkyl groups, each of which may be substituted with one or more substituents. Exemplary alpha cyanoacrylates include, but are not limited to, alkyl cyanoacrylates such as methyl-2-cyanoacrylate, ethyl-2-cyanoacrylate, propyl cyanoacrylates (e.g., n-propyl cyanoacrylate and isopropyl cyanoacrylate), butyl cyanoacrylates (e.g., n-butyl cyanoacrylate, isobutyl cyanoacrylate, sec-butyl cyanoacrylate, and tert-butyl cyanoacrylate), and octyl cyanoacrylates; cycloalkyl cyanoacrylates such as cyclohexyl cyanoacrylate; alkenyl cyanoacrylates such as allyl cyanoacrylate and methallyl cyanoacrylate; cycloalkenyl cyanoacrylates such as cyclohexenyl cyanoacrylate; alkynyl cyanoacrylates such as propargyl cyanoacrylate; aryl cyanoacrylates such as phenyl cyanoacrylate and toluyl cyanoacrylate; oxygen-containing cyanoacrylates such as methoxyethyl cyanoacrylate, ethoxyethyl cyanoacrylate, and furfuryl cyanoacrylate; silicon atom-containing cyanoacrylates such as trimethylsilylmethyl cyanoacrylate, trimethylsilylethyl cyanoacrylate, trimethylsilylpropyl cyanoacrylate and dimethylvinylsilylmethyl alpha-cyanoacrylate; and/or any combination thereof. In particular embodiments, the cyanoacrylate is a $C_{1-8}$ alkyl alpha cyanoacrylate, such as, but not limited to, methyl-2-cyanoacrylate or ethyl-2-cyanoacrylate.

"Alkyl" as used herein alone or as part of another group, refers to a straight or branched chain hydrocarbon containing from 1 to 20 carbon atoms. In some embodiments, the alkyl group may contain 1, 2, or 3 up to 4, 5, 6, 7, 8, 9, 10, 11, 12, 13, 14, 15, 16, 17, 18, 19, or 20 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Lower alkyl" as used herein, is a subset of alkyl and refers to a straight or branched chain hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like. The term "alkyl" or "loweralkyl" is intended to include both substituted and unsubstituted alkyl or loweralkyl unless otherwise indicated and these groups can be substituted with groups such as, but not limited to, polyalkylene oxides (such as PEG), halo (e.g., haloalkyl), alkyl, haloalkyl, alkenyl, alkynyl, cycloalkyl, cycloalkylalkyl, aryl, arylalkyl, hetero- cyclo, heterocycloalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkenyl-S(O)$_m$, haloalkyl-S(O)$_m$, alkenyl-S(O)$_m$, alkynyl-S(O)$_m$, cycloalkyl-S(O)$_m$, cycloalkylalkyl-S(O)$_m$, aryl-S(O)$_m$, arylalkyl-S(O)$_m$, heterocyclo-S(O)$_m$, heterocycloalkyl-S(O)$_m$, amino, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstitutedamino, acylamino, acyloxy, ester, amide, sulfonamide, urea, alkoxyacylamino, aminoacyloxy, nitro or cyano, where m=0, 1, 2 or 3.

"Alkenyl" as used herein alone or as part of another group, refers to a straight or branched chain hydrocarbon containing from 1 to 20 carbon atoms (or in loweralkenyl 1 to 4 carbon atoms) which include 1 to 10 double bonds in the hydrocarbon chain. In some embodiments, the alkenyl group may contain 1, 2, or 3 up to 4, 5, 6, 7, 8, 9, 10, 11, 12, 13, 14, 15, 16, 17, 18, 19, or 20 carbon atoms. Representative examples of alkenyl include, but are not limited to, methylene (=CH$_2$), vinyl (—CH=CH$_2$), allyl (—CH$_2$CH=CH$_2$), 2-butenyl, 3-butenyl, 4-pentenyl, 3-pentenyl, 2-hexenyl, 3-hexenyl, 2,4-heptadiene, and the like. The term "alkenyl" or "loweralkenyl" is intended to include both substituted and unsubstituted alkenyl or loweralkenyl unless otherwise indicated and these groups can be substituted with groups such as those described in connection with alkyl and loweralkyl above.

"Alkynyl" as used herein alone or as part of another group, refers to a straight or branched chain hydrocarbon containing from 1 to 20 carbon atoms (or in loweralkynyl 1 to 4 carbon atoms) which include at least one triple bond in the hydrocarbon chain. In some embodiments, the alkynyl group may contain 2, or 3 up to 4, 5, 6, 7, 8, 9, 10, 11, 12, 13, 14, 15, 16, 17, 18, 19, or 20 carbon atoms. Representative examples of alkynyl include, but are not limited to, 2-propynyl, 3-butynyl, 2-butynyl, 4-pentynyl, 3-pentynyl, and the like. The term "alkynyl" or "loweralkynyl" is intended to include both substituted and unsubstituted alkynyl or loweralkynyl unless otherwise indicated and these groups can be substituted with the same groups as set forth in connection with alkyl and loweralkyl above.

"Cycloalkyl" as used herein alone or as part of another group, refers to a saturated or partially unsaturated cyclic hydrocarbon group containing from 3, 4 or 5 to 6, 7 or 8 carbons (which carbons may be replaced in a heterocyclic group as discussed below). Representative examples of cycloalkyl include, cyclopropyl, cyclobutyl, cyclopentyl, cyclohexyl, cycloheptyl, and cyclooctyl. These rings may be optionally substituted with additional substituents as described herein such as halo or loweralkyl. The term "cycloalkyl" is generic and intended to include heterocyclic groups as discussed below unless specified otherwise.

"Aryl" as used herein alone or as part of another group, refers to a monocyclic carbocyclic ring system or a bicyclic carbocyclic fused ring system or higher having one or more aromatic rings. Representative examples of aryl include, azulenyl, indanyl, indenyl, naphthyl, phenyl, tetrahydronaphthyl, and the like. The term "aryl" is intended to include both substituted and unsubstituted aryl unless otherwise indicated and these groups may be substituted with the same groups as set forth in connection with alkyl and loweralkyl above.

"Arylalkyl" as used herein alone or as part of another group, refers to an aryl group, as defined herein, appended to the parent molecular moiety through an alkyl group, as defined herein. Representative examples of arylalkyl include, but are not limited to, benzyl, 2-phenylethyl, 3-phenylpropyl, 2-naphth-2-ylethyl, and the like.

"Arylalkenyl" as used herein alone or as part of another group, refers to an aryl group, as defined herein, appended to the parent molecular moiety through an alkenyl group, as defined herein.

"Arylalkynyl" as used herein alone or as part of another group, refers to an aryl group, as defined herein, appended to the parent molecular moiety through an alkynyl group, as defined herein.

"Heterocyclic group" or "heterocyclo" as used herein alone or as part of another group, refers to an aliphatic (e.g., fully or partially saturated heterocyclo) or aromatic (e.g., heteroaryl) monocyclic- or a bicyclic-ring system. Monocyclic ring systems are exemplified by any 5 or 6 membered ring containing 1, 2, 3, or 4 heteroatoms independently selected from oxygen, nitrogen and sulfur. The 5 membered ring has from 0-2 double bonds and the 6 membered ring has from 0-3 double bonds. Representative examples of monocyclic ring systems include, but are not limited to, azetidine, azepine, aziridine, diazepine, 1,3-dioxolane, dioxane, dithiane, furan, imidazole, imidazoline, imidazolidine, isothiazole, isothiazoline, isothiazolidine, isoxazole, isoxazoline, isoxazolidine, morpholine, oxadiazole, oxadiazoline, oxadiazolidine, oxazole, oxazoline, oxazolidine, piperazine, piperidine, pyran, pyrazine, pyrazole, pyrazoline, pyrazolidine, pyridine, pyrimidine, pyridazine, pyrrole, pyrroline, pyrrolidine, tetrahydrofuran, tetrahydrothiophene, tetrazine, tetrazole, thiadiazole, thiadiazoline, thiadiazolidine, thiazole, thiazoline, thiazolidine, thiophene, thiomorpholine, thiomorpholine sulfone, thiopyran, triazine, triazole, trithiane, and the like. Bicyclic ring systems are exemplified by any of the above monocyclic ring systems fused to an aryl group as defined herein, a cycloalkyl group as defined herein, or another monocyclic ring system as defined herein. Representative examples of bicyclic ring systems include but are not limited to, for example, benzimidazole, benzothiazole, benzothiadiazole, benzothiophene, benzoxadiazole, benzoxazole, benzofuran, benzopyran, benzothiopyran, benzodioxine, 1,3-benzodioxole, cinnoline, indazole, indole, indoline, indolizine, naphthyridine, isobenzofuran, isobenzothiophene, isoindole, isoindoline, isoquinoline, phthalazine, purine, pyranopyridine, quinoline, quinolizine, quinoxaline, quinazoline, tetrahydroisoquinoline, tetrahydroquinoline, thiopyranopyridine, and the like. These heterocyclic rings include quaternized derivatives thereof and may be optionally substituted with groups such as, but not limited to, halo, alkyl, haloalkyl, alkenyl, alkynyl, cycloalkyl, cycloalkylalkyl, aryl, arylalkyl, heterocyclo, heterocycloalkyl, hydroxyl, alkoxy, alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)$_m$, haloalkyl-S(O)$_m$, alkenyl-S(O)$_m$, alkynyl-S(O)$_m$, cycloalkyl-S(O)$_m$, cycloalkylalkyl-S(O)$_m$, aryl-S(O)$_m$, arylalkyl-S(O)$_m$, heterocyclo-S(O)$_m$, heterocycloalkyl-S(O)$_m$, amino, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1, 2 or 3.

"Alkoxy" as used herein alone or as part of another group, refers to an alkyl or loweralkyl group, as defined herein (and thus includes substituted versions such as polyalkoxy), and is appended to the parent molecular moiety through an oxy group, —O—. Representative examples of alkoxy include, but are not limited to, methoxy, ethoxy, propoxy, 2-propoxy, butoxy, tert-butoxy, pentyloxy, hexyloxy and the like.

"Aryloxy" as used herein alone or as part of another group, refers to an aryl group, as defined herein (and thus includes substituted versions), and is appended to the parent molecular moiety through an oxy group, —O—.

"Halo" as used herein, refers to any suitable halogen, including F, Cl, Br and I.

"Oxo" as used herein, refers to a —O— moiety.

"Oxy" as used herein, refers to a —O— moiety.

"Thio" as used herein, refers to a —S— moiety.

"Silyl" as used herein, refers to a group comprising one or more silicon atoms (Si), such as but not limited to, a group of the formula —SiR$^a$R$^b$R$^c$, wherein R$^a$, R$^b$, and R$^c$ are any suitable independently selected hydrocarbyl group, such as alkyl, aryl, alkylaryl, etc. Examples of silyl groups include, but are not limited to, trimethyl silyl, tert-butyl dimethyl silyl, etc.

"Amine" or "amino group" is intended to mean the radical —NH2.

"Alkylamino" is intended to mean the radical —NHR', where R' is alkyl.

"Dialkylamino" is intended to mean the radical NR'R", where R' R" are each independently an alkyl group.

"Aminoalkyl" refers to an alkyl substituent which is further substituted with one or more amino groups.

The cyanoacrylate (i.e., of the glue 184) can be in monomeric and/or polymeric form. Typically, the cyanoacrylate is in monomeric form prior to being applied to one or more surfaces of the cable 20. However, before and/or during application of the electrically conductive paint composition to the one or more surfaces of the cable 20, the cyanoacrylate can polymerize. In certain embodiments, during and/or after application of the electrically conductive paint composition to the one or more surfaces of the cable 20 (e.g., the semiconductive layer 30 and the EPR insulation layer 24), the cyanoacrylate polymerizes.

The cyanoacrylate can be in solid, powder, gel, and/or liquid form. The cyanoacrylate can be present in the electrically conductive paint composition in an amount of about 0.1% to about 35% by weight of the electrically conductive paint composition or any range therein, such as between about 0.5% to about 20% or between about 1% to about 15% by weight of the electrically conductive paint composition.

The cyanoacrylate can have a set time of between about 2 seconds to about 10 minutes or any range therein, such as between about 5 seconds to about 5 minutes, between about 5 seconds to about 1 minute, or between about 10 seconds to about 30 seconds. In certain embodiments, the cyanoacrylate has a set time of between about 10 seconds to about 1 minute. "Set time" as used herein, refers to the amount of time it takes for a cyanoacrylate to convert to a fixed and/or hardened state. Thus, after the set time, the cyanoacrylate can no longer be applied to one or more surfaces of the cable 20. The cyanoacrylate can continue to cure for about 36 hours or more after the set time.

The cyanoacrylate, when present in the form of a gel or liquid, can have a low to medium viscosity, such as a viscosity between about 1 mPa·s to about 1,000 mPa·s at 25° C. or any range therein, such as between about 1 mPa·s to about 800 mPa·s, between about 4 mPa·s to about 500 mPa·s, between about 10 mPa·s to about 50 mPa·s, or between about 20 mPa·s to about 100 mPa·s at 25° C.

In certain embodiments of the present invention, the glue 184, such as a cyanoacrylate, is separate from the electrically conductive paint 182 until immediately before application of the electrically conductive paint composition. The electrically conductive paint composition can be prepared by combining, mixing, shaking, and/or stirring the glue 184 and the electrically conductive paint 182. The ratio of the electrically conductive paint 182 to the glue 184, such as a cyanoacrylate, can be between about 10:3 to about 15:3 or any range therein. In certain embodiments of the present invention, the ratio of the electrically conductive paint 182 and the glue 184 is about 10:3, 11:3, 12:3, 13:3, 14:3, or 15:3. In certain embodiments of the present invention, the electrically conductive paint composition comprises a commercially available electrically conductive paint and a commercially available cyanoacrylate.

The electrically conductive paint composition can have a set time of between about 5 seconds to about 15 minutes or any range therein, such as between about 5 seconds to about 12 minutes, between about 10 seconds to about 7 minutes, between about 10 seconds to about 5 minutes, or between about 10 seconds to about 1 minute. In certain embodiments, the electrically conductive paint composition has a set time of between about 10 seconds to about 5 minutes. "Set time" as used herein, refers to the amount of time it takes for an electrically conductive paint composition to convert to a fixed and/or hardened state. Thus, after the set time, the electrically conductive paint composition can no longer be applied to one or more surfaces of the cable 20. The electrically conductive paint composition can continue to cure for about 48 hours or more after the set time.

The electrically conductive paint composition can optionally comprise one or more solvent(s) 186. Exemplary solvents include, but are not limited to, water; alcohols such as methanol, ethanol, isopropanol, and butanol; ketones such as methyl ethyl ketone, methyl isobutyl ketone, and N-methyl-2-pyrrolidone; esters, such as, butyl acetate; ethers such as alkyl ethers, dialkyl ethers, glycol ethers; and the like. Further exemplary solvents include those described in U.S. Pat. No. 7,001,947, which is incorporated herein by reference. In particular embodiments of the present invention, the solvent is a ketone such as methyl ethyl ketone.

In certain embodiments of the present invention, the electrically conductive paint composition can further comprise one or more solvent(s) 186. According to some embodiments, the one or more solvent(s) 186 can be added to the electrically conductive paint 182 and/or glue 184 before, during, and/or after the glue 184 and the electrically conductive paint 182 are combined. In some embodiments of the present invention, the one or more solvent(s) 186 is added to the electrically conductive paint 182 before the glue 184 is combined with the electrically conductive paint 182.

The one or more solvent(s) 186, in some embodiments, can be added to the electrically conductive paint composition to increase the set time of the electrically conductive paint composition. In particular embodiments of the present invention, by adding one or more solvent(s) 186 to the electrically conductive paint composition, the set time of the electrically conductive paint composition can be increased by between about 2 seconds to about 15 minutes or any range therein, such as between about 5 seconds and 10 minutes, between about 10 seconds and 5 minutes, or between about 20 seconds and 2 minutes. In other embodiments of the present invention, the one or more solvent(s) 186 can be added to the electrically conductive paint composition to increase the viscosity of the electrically conductive paint composition and/or to increase and/or improve the solubility of the glue 184 in the electrically conductive paint composition.

The electrically conductive paint composition can further comprise additives known to those skilled in the art. Such additives include, but are not limited to, stabilizers, accelerators, plasticizers, fillers, opacifiers, thickeners, viscosity modifiers, inhibitors, thixotrophy conferring agents, dyes, thermal degradation enhancers, combinations thereof, and the like, such as those described in U.S. Pat. No. 6,833,196, which is incorporated herein by reference.

The tape 181 may be any suitable tape. According to some embodiments, the tape 181 is a self-adhesive PTFE tape.

The cable preparation system may be used as follows in accordance with embodiments of the invention to prepare the cable 20.

An end section of the cable jacket 28 is cut away to expose the semiconductive layer 30. The jacket 28 may be removed in any suitable manner such as by cutting the jacket circumferentially and axially and stripping. The neutral conductors 26 and any other screen wires, tapes, lead sheath, corrugated sheath, bedding tapes or the like may be bent back or removed as desired to expose the semiconductive layer 30 as shown in FIGS. 2-5 and 8.

With reference to FIGS. 2-5, with the yoke 162 retracted (so that the bit 116 is radially spaced apart from the cable 20 as shown in FIG. 2), the straps 150, 152 are looped over the cable 20 and the cutting apparatus 100 is axially positioned along the length of the cable 20 to position the cutting bit 116 adjacent the location where the operator intends to terminate the semiconductive layer 30. The strap adjustment handle 156C is rotated to tighten the straps 150, 152 and draw the plate 134 and the tracking rollers 148 snugly against the exposed semiconductive layer 30.

Optionally, stop devices may be used to limit or prevent movement or migration of the mounting tool 120 axially along the length of the cable 20 before or during execution of the grinding step. For example, a pair of spring clamps 153 may be secured about the circumference of the cable 20 immediately above the strap section 150A and immediately below the strap section 152A, respectively.

The power driver 110 is actuated to rotate the cutting bit 116 in a rotation direction R as shown in FIG. 4. The rotation direction R is transverse to and, according to some embodiments, perpendicular to, the circumference of the cable 20 (and thus, transverse or perpendicular to the dividing groove 40 to be formed in the semiconductive layer 30). That is, the rotation of the bit 116 or grinding surface 117 defines a bit plane M-M (FIGS. 4 and 7) that is orthogonal to a groove plane N-N (FIGS. 5 and 7) defined by the circumferential groove 40 in the semiconductive layer 30. According to some embodiments, the axis of rotation V-V (FIG. 7) of the grinding surface 117 is transverse to, and in some embodiments, perpendicular to the cable axis A-A). The rotation direction R is also selected such that the portion of the grinding surface 117 facing (i.e., most proximate) the semiconductive layer 30 rotates in a direction from the inner end of the cable 20 (i.e., the end on which the semiconductive layer 30 is to be retained) to the outer or terminal end of the cable 20 (i.e., the end from which the semiconductive layer 30 is to be removed.

According to some embodiments, the bit 116 is rotated at a rate in the range of from about 10000 to 33000 RPM.

With the bit 116 being rotated, the operator rotates the adjustor knob 169 to slide the yoke 162 toward the cable 20 and to thereby drive the grinding surface 117 radially (with respect to the cable) into the semiconductive layer 30. The grinding surface 117 grinds away a notch or slot in the semiconductive layer 30. The direction of rotation R of the grinding surface 117 is such that the portion of the grinding surface 117 engaging the semiconductive layer 30 travels or rotates axially away from the portion of the semiconductive layer 30 to be retained on the cable 20.

The operator then pivots or rotates the cutting apparatus 100 in a circumferential pivot direction P (FIGS. 5 and 7) about the circumference of the cable 20 with the straps 150, 152 still engaged and the bit 116 still being driven in the direction R. As the cutting apparatus 100 is so pivoted, the grinding surface side portion 117B grinds away the encountered material of the semiconductive layer 30 to thereby for an elongate circumferential groove 41 as shown in FIG. 7. The tracking rollers 148 facilitate smooth and nonbinding pivoting of the mounting tool 120 about the cable 20 while maintaining a uniform spacing between the yoke 162 and the semiconductive layer 30 and thereby a uniform depth of the grinding surface 117 into the semiconductive layer 30. The cutting tool 100 is pivoted about the cable 20 a full revolution (i.e., about 360 degrees) so that a full annular circumferential groove is formed in the semiconductive layer 30.

According to some embodiments, multiple, axially coincident, progressively deeper circumferential grooves are formed in the semiconductive layer 30 as described above. That is, a first or preliminary circumferential groove is formed to a first depth, the depth adjustment mechanism 160 is used to set the bit 116 at a second, deeper depth, the cutting tool 100 is pivoted around the cable 20 to form a second, deeper annular circumferential groove at the same axial location along the cable 20, and so forth, until the desired ultimate depth is reached. According to some embodiments, at least three such passes are executed to form progressively deeper grooves.

An exemplary ultimate, final or completed dividing groove 40 is shown in FIGS. 2-5 and 9. After the groove 40 is completed, the bit 116 is retracted using the depth adjustment mechanism 160 and the strap adjustment mechanism 156 is actuated to loosen the straps 150, 160, and the cutting tool 100 is removed from the cable.

Figure 10:
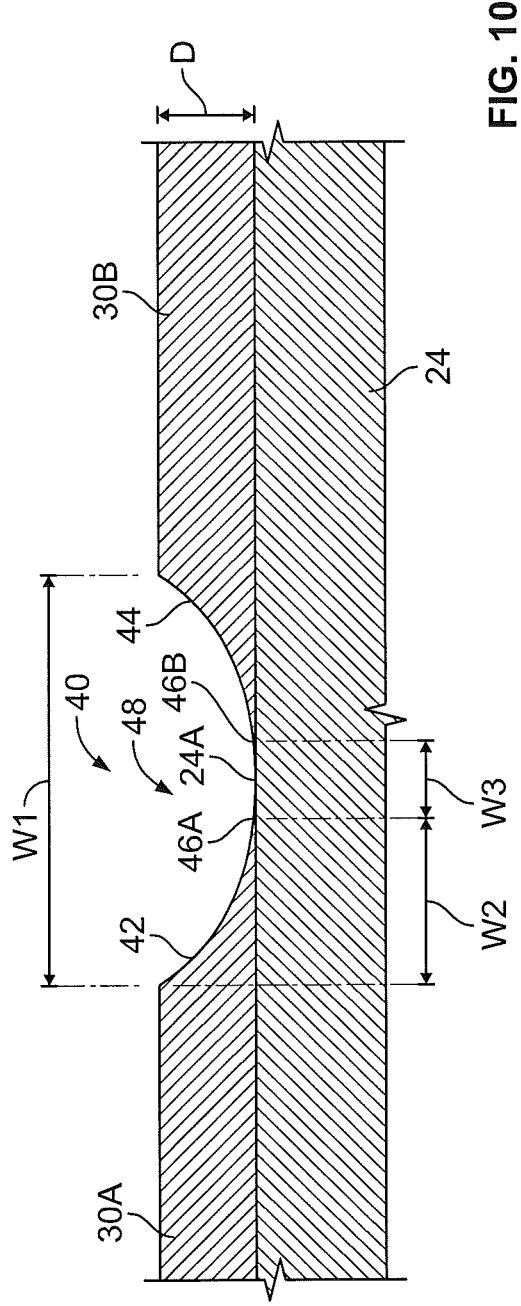

Due to the round or circular profile of the grinding surface 117 of the bit 116, the groove 40 has opposed chamfered sidewalls 42 and 44 as shown in FIGS. 2 and 10. An annular circumferential section of the semiconductive layer 30 has been fully removed by the bit 116 so that an annular segment 24A of the insulation 24 is exposed between opposed, spaced apart terminal edges 46A and 46B of the now fully severed semiconductive layer 30. A gap 48 is defined between the edges 46A, 46B. The sidewall 42 is arcuately tapered in an axial direction toward the terminal edge 46A.

Figure 11:
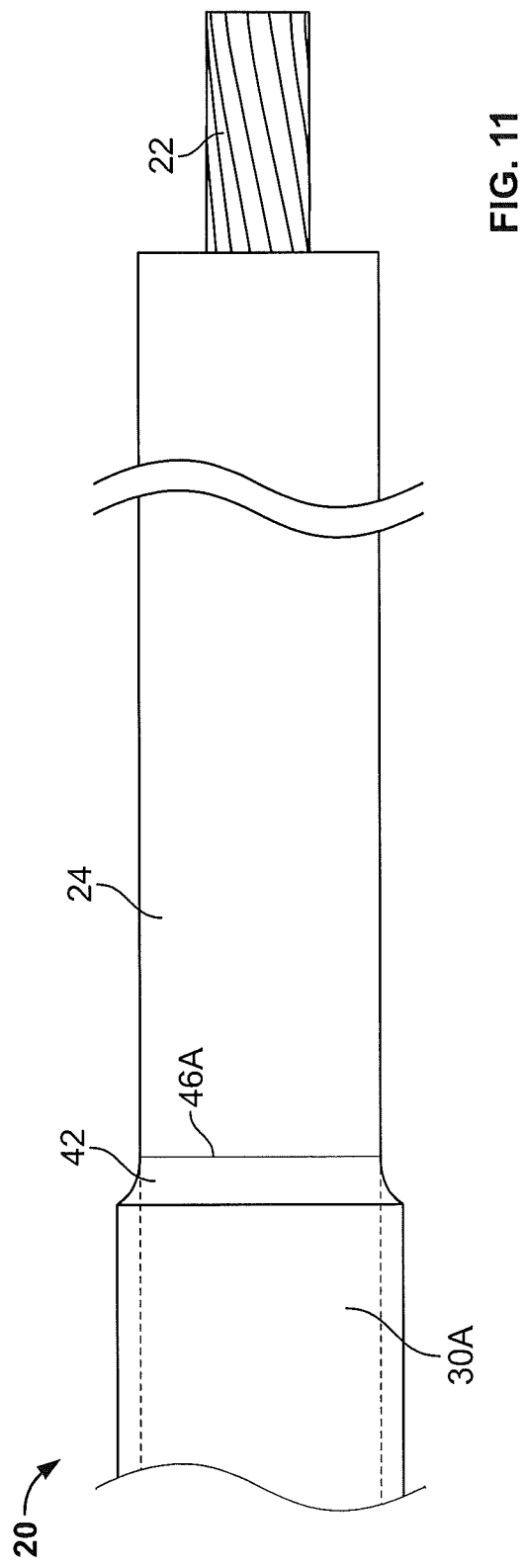

The semiconductive layer 30 is effectively divided into a retained section 30A and a waste section 30B by the groove 40 (FIG. 9). A generally axially extending slit C (FIG. 9) may be formed in the section 30B and the section 30B peeled away to expose the insulation 24 as shown in FIG. 11. Notably, the chamfered sidewall 42 remains to smoothly transition the profile of the semiconductive layer section 30A from its outer diameter to the terminal edge 46A interfacing the beginning of the exposed insulation 24. A grinding cloth or other sanding or polishing device may be used to smooth the upper corner of the chamfered side wall 42.

According to some embodiments, the depth D (FIG. 10) of the groove 40 is in the range of from about 0.5 mm to 2.5 mm. According to some embodiments, the depth D is substantially the same as the thickness T1 of the semiconductive layer 30.

According to some embodiments, the width W1 (FIG. 10) of the groove 40 is between about 8 mm and 15 mm.

According to some embodiments, the width W2 (FIG. 10) of the chamfered sidewall 42 is between about 3 mm and 7 mm. According to some embodiments, the width W3 (FIG. 10) of the gap 48 is between about 0.1 mm and 5 mm.

According to some embodiments, the ratio of the width W2 to the depth D is at least 1 and, according to some embodiments, is between about 1 and 2.

According to some embodiments, the thickness T2 (FIG. 10) of the semiconductive layer terminal edge 46A substantially merges with the outer diameter of the insulation 24.

The masking tape 181 is wrapped circumferentially about the insulation 24 a selected axial distance from the terminal edge 46A, as shown in FIG. 12. The location of the tape 181 corresponds to the intended terminal end of the effective semiconductive layer.

The paint 182 is then shaken in the vessel 182A on-site and in the vicinity of the cable 20. The glue 184 is added to the paint 182 in the vessel 182A and the mixture is shaken to form the electrically conductive paint composition. According to some embodiments, the mixture is shaken from about 5 to 10 seconds. The solvent 186 may also be mixed in with the paint 182 and the glue 184 to extend the curing time.

The conductive paint composition is then applied or painted onto the insulation 24 and a section 30C of the semiconductive layer section 30A using the brush 188 to form a paint coat or layer 190 (FIGS. 12 and 13). According to some embodiments, the paint composition is applied starting from the end adjacent the tape 181 to the end overlapping the section 30C so that the layer 190 is thinner on the tape 181 end (i.e., a thickness gradient is provided from end to end). A portion 190A of the paint layer 190 surrounds the insulation 24 and a portion 190B of the paint layer 190 surrounds the semiconductive layer section 30C.

After the paint layer 190 has cured, the tape 181 can be removed. According to some embodiments, the set time for the conductive paint composition is less than about 5 minutes and the electrically conductive paint composition is applied to the insulation 24 within 1 minute of the step of mixing the paint 182 and the glue 184.

Desired cable accessories can thereafter be installed on the prepared cable. According to some embodiments, the stress cone 60 is installed on the cable 20 around the terminal edge 46A and the paint layer 190.

The methods and apparatus as disclosed herein can provide significant advantages.

The cutting methods and cutting apparatus 100 can ease the preparation of polymer insulated cables, particular EPR cables, on-site for the installation of cable accessories. The chamfered sidewall 42 provides a smooth transition from the outer diameter of the semiconductive layer 30 to the outer diameter of the insulation 24 for a conforming cable accessory (e.g., the stress cone 60) surrounding the cable 20. The use of a rotating cutting bit 116 to grind away the semiconductive layer 30 and the cutting apparatus 100 can prevent, limit or reduce the risk of a thin layer of the semiconductive layer 30 to be retained on the cable 20 being lifted off of or delaminating from the insulation 24.

The mounting tool 120 can facilitate the accurate, reliable, consistent and convenient formation of the groove 40 and the chamfered sidewall 42. The cutting apparatus 100 can be selectively adjusted to fit cables of different diameters. The cutting apparatus 100 can be selectively adjusted to properly form severing grooves in cables having semiconductive layers 30 of different thicknesses.

The tungsten carbide cutting bit 116 generates relatively low heat when grinding, thereby reducing or eliminating the risk of damaging or distorting the semiconductive layer 30.

The paint system 180 reduces the sensitivity of the painted conductive layer 190 by improving the bonding between the paint and the EPR cable insulation 24. The conductive paint layer 190 provides a very small transition step between the effective semiconductive layer (i.e., the semiconductive layer 30 effectively extended by the paint layer 190), and thereby provides a smoother profile for an overlying cable accessory such as the stress cone 60. The relatively quick curing time (and adjustability thereof) provides a short wait for curing of the paint layer, which can speed the installation procedure and reduce the risk that a cable accessory will be installed before the paint layer is sufficiently cured and will damage the paint layer.

According to some embodiments, the length L1 (FIG. 13) of the paint layer portion 190A is between about 10 mm and 30 mm. According to some embodiments, the length L2 of the paint layer portion 190B is between about 5 mm and 20 mm.

According to some embodiments, the thickness T3 (FIG. 13) of the paint layer 190 at the end distal from the semiconductive layer 30 is in the range of from about 0.05 mm to 0.5 mm.

According to some embodiments, the cutting apparatus 100 and the paint system 180 are provided as a pre-combined kit for an installer. According to some embodiments, the paint system 180 is provided as a pre-combined kit without the cutting apparatus 100.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for preparing a polymer insulated cable including a semiconductive layer surrounding a polymeric insulation layer, and a cable jacket surrounding the semiconductive layer, the method comprising:
    cutting away an end section of the cable jacket to expose the semiconductive layer; thereafter
    cutting the semiconductive layer by grinding a circumferential dividing groove in the semiconductive layer using a rotating grinding surface, wherein the dividing groove defines first and second semiconductive sections of the semiconductive layer on opposed sides of the dividing groove; and thereafter
    removing the second semiconductive section from the polymeric insulation layer while retaining the first semiconductive section on the polymeric insulation layer.

2. The method of claim 1 wherein the insulation layer is formed of ethylene propylene rubber (EPR).

3. The method of claim 1 including rotating the grinding surface circumferentially around the cable while rotating the grinding surface in contact with the semiconductive layer.

4. The method of claim 1 wherein the grinding surface is formed of tungsten carbide.

5. The method of claim 1 including rotating the grinding surface using a power driver.

6. The method of claim 5 including releasably coupling the power driver and the grinding surface to the cable using a mounting tool.

7. The method of claim 1 including:
    cutting a circumferential preliminary groove in the semiconductive layer using the rotating grinding surface at an axial position along the cable, the preliminary groove having a first depth; and thereafter
    cutting the dividing groove into the semiconductive layer within the preliminary groove at the axial position.

8. The method of claim 1 wherein the dividing groove extends fully through the semiconductive layer so that a segment of the polymeric insulation layer is exposed between the first and second semiconductive sections and through the dividing groove.

9. A method for preparing a polymer insulated cable including a semiconductive layer surrounding a polymeric insulation layer, the method comprising:
    cutting a circumferential preliminary groove in the semiconductive layer using a rotating grinding surface at an axial position along the cable, the preliminary groove having a first depth; thereafter
    cutting the semiconductive layer by grinding a circumferential dividing groove in the semiconductive layer within the preliminary groove at the axial position using the rotating grinding surface, wherein the dividing groove defines first and second semiconductive sections of the semiconductive layer on opposed sides of the dividing groove; and thereafter
    removing the second semiconductive section from the polymeric insulation layer while retaining the first semiconductive section on the polymeric insulation layer.

10. A method for preparing a polymer insulated cable including a semiconductive layer surrounding a polymeric insulation layer, the method comprising:
    cutting the semiconductive layer by grinding a circumferential dividing groove in the semiconductive layer using a rotating grinding surface, wherein the dividing groove defines first and second semiconductive sections of the semiconductive layer on opposed sides of the dividing groove; and thereafter
    removing the second semiconductive section from the polymeric insulation layer while retaining the first semiconductive section on the polymeric insulation layer;
    wherein the dividing groove extends fully through the semiconductive layer so that a segment of the polymeric insulation layer is exposed between the first and second semiconductive sections and through the dividing groove.

* * * * *

UNITED STATES PATENT AND TRADEMARK OFFICE
CERTIFICATE OF CORRECTION

PATENT NO. : 10,276,284 B2
APPLICATION NO. : 15/899415
DATED : April 30, 2019
INVENTOR(S) : Kehl et al.

Page 1 of 1

It is certified that error appears in the above-identified patent and that said Letters Patent is hereby corrected as shown below:

In the Specification

Column 12, Line 10: Please correct "—O—" to read -- =O --

Signed and Sealed this
Twentieth Day of August, 2019

Andrei Iancu
*Director of the United States Patent and Trademark Office*